UNITED STATES PATENT OFFICE.

ALONZO TEMPLE, OF BRIDGEPORT, CONNECTICUT, ASSIGNOR TO HIMSELF AND J. L. FITCH, OF SAME PLACE.

IMPROVED COMPOSITION FOR PREVENTING INCRUSTATION IN STEAM-BOILERS.

Specification forming part of Letters Patent No. 45,303, dated November 29, 1864.

*To all whom it may concern:*

Be it known that I, ALONZO TEMPLE, of Bridgeport, in the county of Fairfield and State of Connecticut, have invented a new and useful Composition for Removing and Preventing the Incrustation of Steam-Boilers; and I do hereby declare the following to be a full, clear, and exact description of the same.

My invention has for its object to prevent the incrustation of steam-boilers, or to remove the same already formed therein, thereby preserving the boiler and rendering it more efficient than it otherwise would be.

To enable others to prepare my composition, I will proceed to fully describe my method of so doing.

To twelve parts of terra-japonica add three parts of nut-galls bruised to powder and one part of cocoa-nut oil. Boil together over a slow fire until the composition attains the consistency of molasses and the composition is ready for use. Introduce about three pints of this compound to each horse power of the boiler into the boiler and the object will be attained.

I claim as of my invention and desire to secure by Letters Patent—

The within-described composition for preventing or removing incrustation of steam-boilers.

ALONZO TEMPLE.

Witnesses:
JOHN E. EARLE,
RUFUS SANFORD.